US009395743B2

(12) United States Patent
Anderson et al.

(10) Patent No.: US 9,395,743 B2
(45) Date of Patent: *Jul. 19, 2016

(54) TRANSMISSION AND HOIST CONTROL ARRANGEMENT (71) Applicant: Caterpillar Inc., Peoria, IL (US)

(72) Inventors: Jared S. Anderson, Yates City, IL (US); Anthony S. Cooksey, Metamora, IL (US); Ian A. Tiggemann, Peoria, IL (US); Brad R. Van De Veer, Washington, IL (US); Daniel J. Whiting, Peoria, IL (US); Kurt L. Winckler, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,399

(22) Filed: Jul. 20, 2015

(65) Prior Publication Data

US 2015/0323955 A1    Nov. 12, 2015

Related U.S. Application Data (63) Continuation of application No. 14/257,316, filed on Apr. 21, 2014, now Pat. No. 9,086,130.

(51) Int. Cl.
*B60P 1/04* (2006.01)
*B60K 26/00* (2006.01)
*G05G 13/00* (2006.01)
*F16H 59/02* (2006.01)
*G05G 1/06* (2006.01)

(52) U.S. Cl.
CPC . *G05G 13/00* (2013.01); *B60P 1/04* (2013.01); *F16H 59/0217* (2013.01); *G05G 1/06* (2013.01); *Y10T 74/20207* (2015.01)

(58) Field of Classification Search
CPC ... F16H 59/0217; F16H 59/0278; B60P 1/04; G05G 9/04; G05G 2009/04774; G05G 9/02; G05G 1/06; E02F 9/2004
USPC .......... 74/471 R, 491; 180/333, 336
See application file for complete search history.

(56) References Cited

U.S. PATENT DOCUMENTS

| 7,178,623 | B2 | 2/2007 | Ginzel et al. | |
|---|---|---|---|---|
| 7,393,304 | B2 | 7/2008 | Wilde et al. | |
| 7,635,045 | B2* | 12/2009 | Shearer | E02F 9/2004 180/315 |
| 7,681,686 | B1* | 3/2010 | Klas | B60K 26/00 180/329 |
| 8,077,023 | B2 | 12/2011 | King et al. | |
| 8,483,914 | B2* | 7/2013 | Copeland | B60N 2/0232 701/50 |
| 2010/0050803 | A1* | 3/2010 | Stamate | E02F 9/2004 74/471 XY |
| 2010/0057307 | A1* | 3/2010 | Copeland | B60N 2/0232 701/50 |
| 2013/0306395 | A1 | 11/2013 | Frazier et al. | |

* cited by examiner

*Primary Examiner* — Ruth Ilan
(74) *Attorney, Agent, or Firm* — Edward Lin (57) ABSTRACT A knob body is provided for a control lever. The knob body includes a lower segment, and an upper segment. The lower segment extends out from a vertical axis of the control lever and includes a pair of upright protrusions extending out from an upper portion thereof. The protrusions define a gap therebetween. The lower segment further includes a movable switch located within the gap. The upper segment is disposed about the vertical axis and is located proximate to the upper portion of the lower segment. The upper segment is in a spaced relationship relative to the protrusions. The upper segment can include at least one of a locking switch that is operable to allow selective movement of the control lever and an actuation switch.

20 Claims, 7 Drawing Sheets

TRANSMISSION AND HOIST CONTROL ARRANGEMENT

CROSS REFERENCE TO RELATED APPLICATIONS

This application is a continuation of U.S. application Ser. No. 14/257,316, filed Apr. 21, 2014.

TECHNICAL FIELD

The present disclosure generally relates to a transmission and hoist control arrangement for a machine. More particularly, the present disclosure relates to a knob body for a control lever of the machine.

BACKGROUND

Machines having a payload carrier include input devices to control transmission of the machine and hoisting functions associated with movement of the payload carrier. Operators of such machines may sometimes need to control both the transmission and hoisting functions concurrently, for example, during a dump cycle of the machine.

Conventionally, separate input devices are used to independently control the transmission and the hoisting functions of the machine. A first input device may allow the operator to set transmission settings and gear transmission settings for the machine. A second input device may allow the operator to control a plurality of actuators in order to raise, lower, hold or float the payload carrier of the machine.

However, such separate input devices are expensive and may require additional space within an operator station of the machine. Moreover, operating separate input devices to simultaneously control the transmission and hoisting functions may require the operator to constantly switch hands between the separate controls. This may result in difficulty of operation of the separate input devices. Input devices having multiple functionalities have recently come into use. However, such devices do not offer the feature of simultaneous control over the transmission and the hoisting functions of the machine.

Therefore, there is a need for an improved input device to overcome the above mentioned shortcomings.

SUMMARY OF THE DISCLOSURE

In one aspect of the present disclosure, a knob body for a control lever of a machine is disclosed. The knob body includes a lower segment extending out from a vertical axis of the control lever. The lower segment includes a pair of upright protrusions extending out from an upper portion of the lower segment of the control lever and defining a gap between the protrusions. A movable switch extends from the upper portion within the gap between the protrusions. An upper segment is disposed about the vertical axis of the control lever and located proximate to the upper portion of the lower segment. The upper segment is in a spaced relationship relative to the protrusions. The upper segment includes at least one of a locking switch operable to allow selective movement of the control lever and an actuation switch.

In another aspect of the present disclosure, an input device is provided for controlling a machine. The input device includes a basal pod defining a slotted groove thereon. A detent plate is disposed in operable engagement with the slotted groove. A control lever is coupled to the detent plate and defined about a vertical axis. The control lever is operable to select from a plurality of transmission modes with movement between a first direction and second direction. A knob body is coupled to the control lever. The knob body has a lower segment laterally disposed in relation to the vertical axis of the control lever. A pair of upright protrusions extends out from an upper portion of the lower segment. The protrusions define gap therebetween. A movable switch extends from the upper portion and located within the gap defined between the protrusions. An upper segment is disposed about the vertical axis of the control lever and located proximate to the upper portion of the lower segment, the upper segment in a spaced relationship relative to the protrusions. A locking switch is operable to allow selective movement of the control lever.

In yet another aspect, a machine is provided. The machine has a frame, a transmission disposed on the frame, and a payload carrier pivotally attached to the frame. The machine further includes an actuator coupled between the frame and the payload carrier. The actuator is configured to raise and lower the payload carrier relative to the frame. The machine further includes an input device communicably coupled to the transmission and the actuator. The input device includes a basal pod and a control lever extending upright from the basal pod about a vertical axis. The control lever is operable to select from a plurality of transmission modes with movement between a first direction and second direction. A knob body is coupled to the control lever. The knob body includes a lower segment laterally disposed in relation to the vertical axis of the control lever. The lower segment has a pair of upright protrusions extending out from an upper portion of the lower segment. The protrusions define a gap therebetween. A movable switch extends from the upper portion and located within the gap defined between the protrusions. The movable switch is operable to select from a plurality of hoisting functions for the payload carrier.

Other features and aspects of this disclosure will be apparent from the following description and the accompanying drawings.

DETAILED DESCRIPTION

Figure 1:
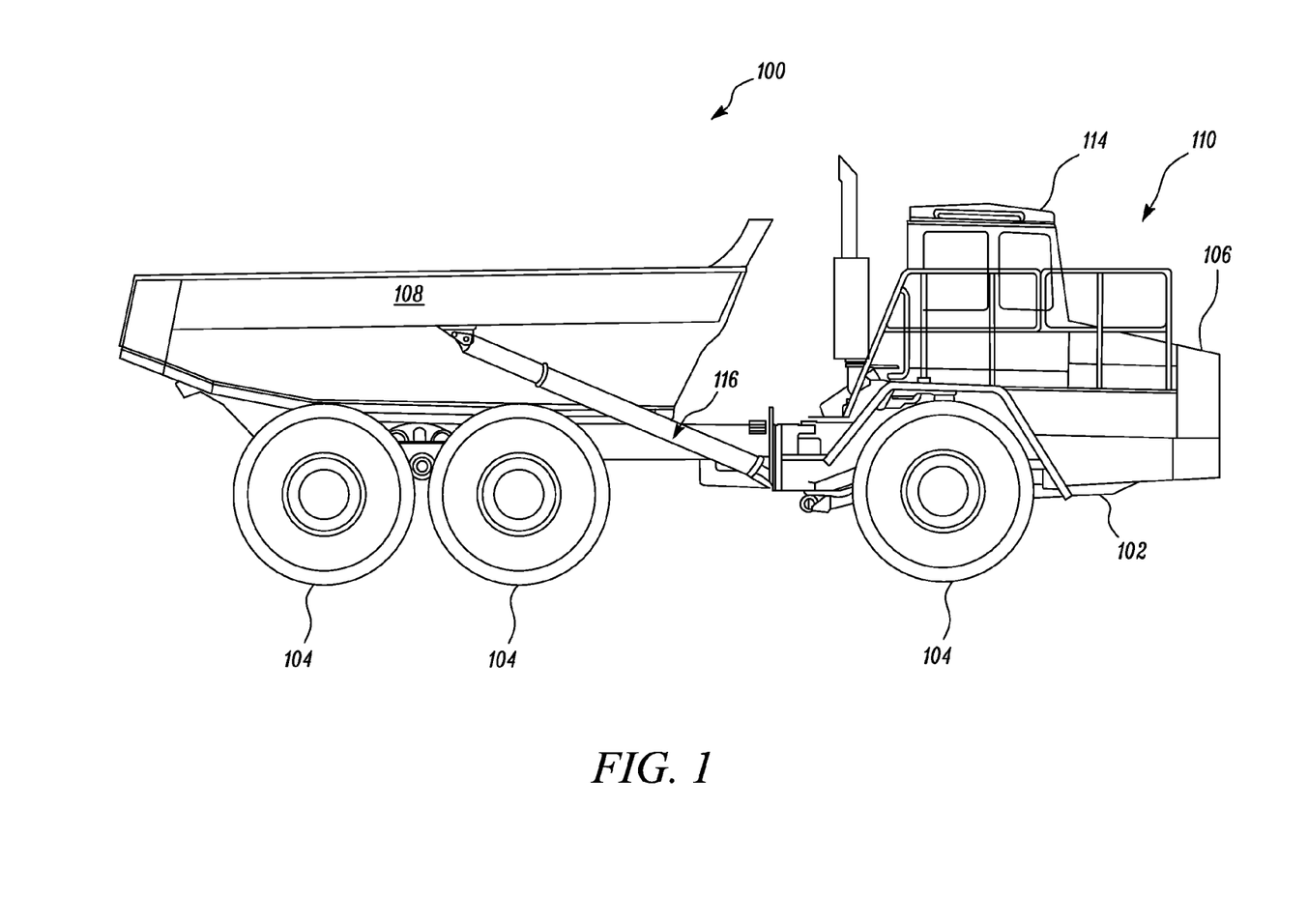
FIG. 1 is a side view of an exemplary machine, according to an embodiment of the present disclosure.

FIG. 1 illustrates an exemplary machine 100. In an embodiment, the machine 100 may be a wheeled machine. As shown in the embodiment of FIG. 1, the machine 100 is embodied in the form of an articulated truck. However, the machine 100 may be alternatively embodied as an off-highway truck having outriggers that help the machine 100 to be stationed on a worksite.

As shown in FIG. 1, the machine 100 includes a frame 102, wheels 104, an engine compartment 106, and a payload carrier 108. The machine 100 may further include an engine positioned in the engine compartment 106 and supported on the frame 102. The engine may be an internal combustion engine, for example, a petrol engine, a diesel engine, or a gas powered engine.

Referring to FIG. 1, the machine 100 further includes a cab 114 mounted on a front end 110 of the frame 102. The cab 114 may be disposed above the engine and extend rearward of the engine. In some embodiments, the cab 114 may enclose the engine by forming a portion of the engine compartment 106. In other embodiments, the cab 114 may be pivotally mounted to the frame 102, such that the cab 114 may be tilted to provide access to the engine. Also, in case the machine 100 is an off-highway truck, the outriggers may be additionally located at a rear of the engine compartment 106. Beneficially, a pair or two pairs of outriggers may be located adjacent to and on either side of the rear wheels 104.

With reference to the machine 100 depicted in FIG. 1, during operation, the payload carrier 108 may be raised or lowered with respect to the frame 102 by means of an actuator 116. The actuator 116 is coupled between the frame 102 and the payload carrier 108. In an embodiment of the present disclosure, the articulated truck depicted in FIG. 1, may optionally employ an ejector positioned within the payload carrier 108. Although the present disclosure is explained in conjunction with the actuator 116 that is associated with the payload carrier 108 of FIG. 1, one of ordinary skill in the art will acknowledge that the present disclosure may be similarly applied in the case of ejectors, and other suitable actuating mechanisms commonly known in the art.

The present disclosure relates to an input device 202 for controlling the machine 100. Specifically, the present disclosure relates to an input device 202 for controlling the transmission and also the hoisting of the payload carrier 108 in the machine 100.

Figure 2:
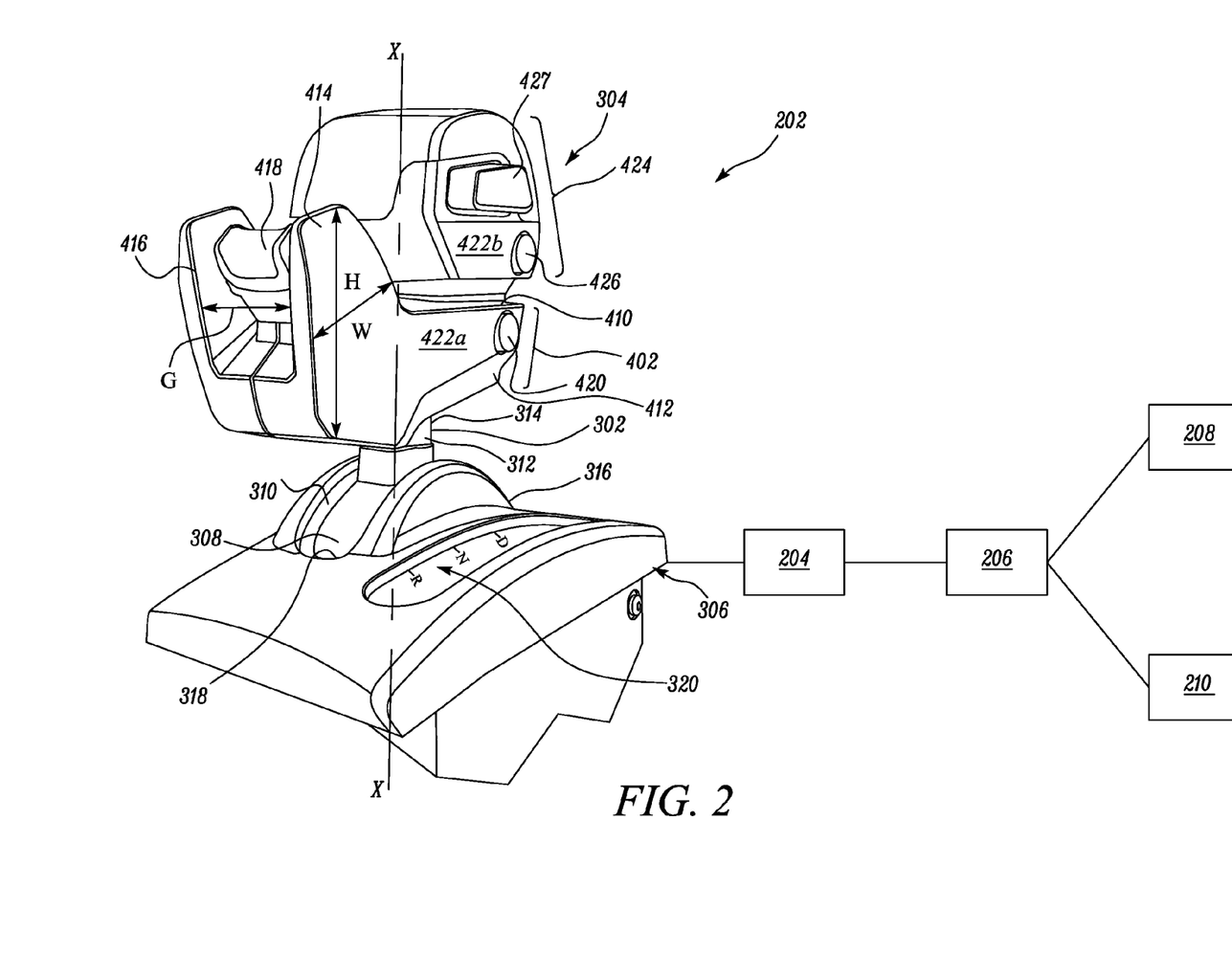
FIG. 2 is an exemplary block diagram of functional components of the machine for transmission and hoist control.

Referring to FIG. 2, in one embodiment, the input device 202 may be placed in the cab 114. The input device 202 is communicably coupled to the transmission and the actuator 116 via an engine control unit (ECU) 204 of the machine 100. The input device 202 may receive inputs indicative of operator commands for transmission control and/or hoisting control of the machine 100. Based on the inputs received from the operator, the input device 202 may send control signals to the ECU 204. A person of ordinary skill in the art will appreciate that the ECU 204 may control a variety of functions on the machine 100. However, for the purpose of this disclosure, we will consider the transmission control 208 and the hoist control 210 for the payload carrier 108 of the machine 100.

As shown, the ECU 204 may be coupled to a hydraulics control system 206 of the machine 100. The hydraulics control system 206 may be communicably disposed between the ECU 204 and each of the transmission and hoist controls 208, 210, of the machine 100. The hydraulics control system 206 is configured to receive inputs from the ECU 204 for controlling the transmission control 208 and/or the hoist control 210. The hydraulics control system 206 may hence, effectuate a movement of the payload carrier 108 relative to the frame 102 and/or control the transmission of the machine 100, based on control signals received from the ECU 204.

The transmission control 208 is configured to set a transmission mode of the machine 100 and/or execute other related operations in the transmission of the machine 100. For example, the transmission control 208 may execute various modes of operation in the transmission of the machine 100 such as drive mode, reverse mode, park mode and the like. Moreover, the transmission control 208 may upshift or downshift a gear for controlling a travel speed of the machine 100. Optionally, the transmission may also hold a gear for a desired period of time. In an embodiment of the present disclosure, the transmission modes include at least a park mode, a reverse mode, a neutral mode, and a drive mode.

The hoist control 210 is configured to effect a hoisting of the payload carrier 108 based on inputs provided via the input device 202. In an embodiment, the hoisting functions associated with the payload carrier 108 may include any one of lower, hold, float and raise functions. However, in an alternative embodiment, if the input device 202 is implemented in articulated trucks having ejectors therein, then the hoist control 210 can correspondingly be configured to execute hoisting functions such as eject, hold, and return functions in lieu of the lower, hold, float and raise functions.

Figure 3A:
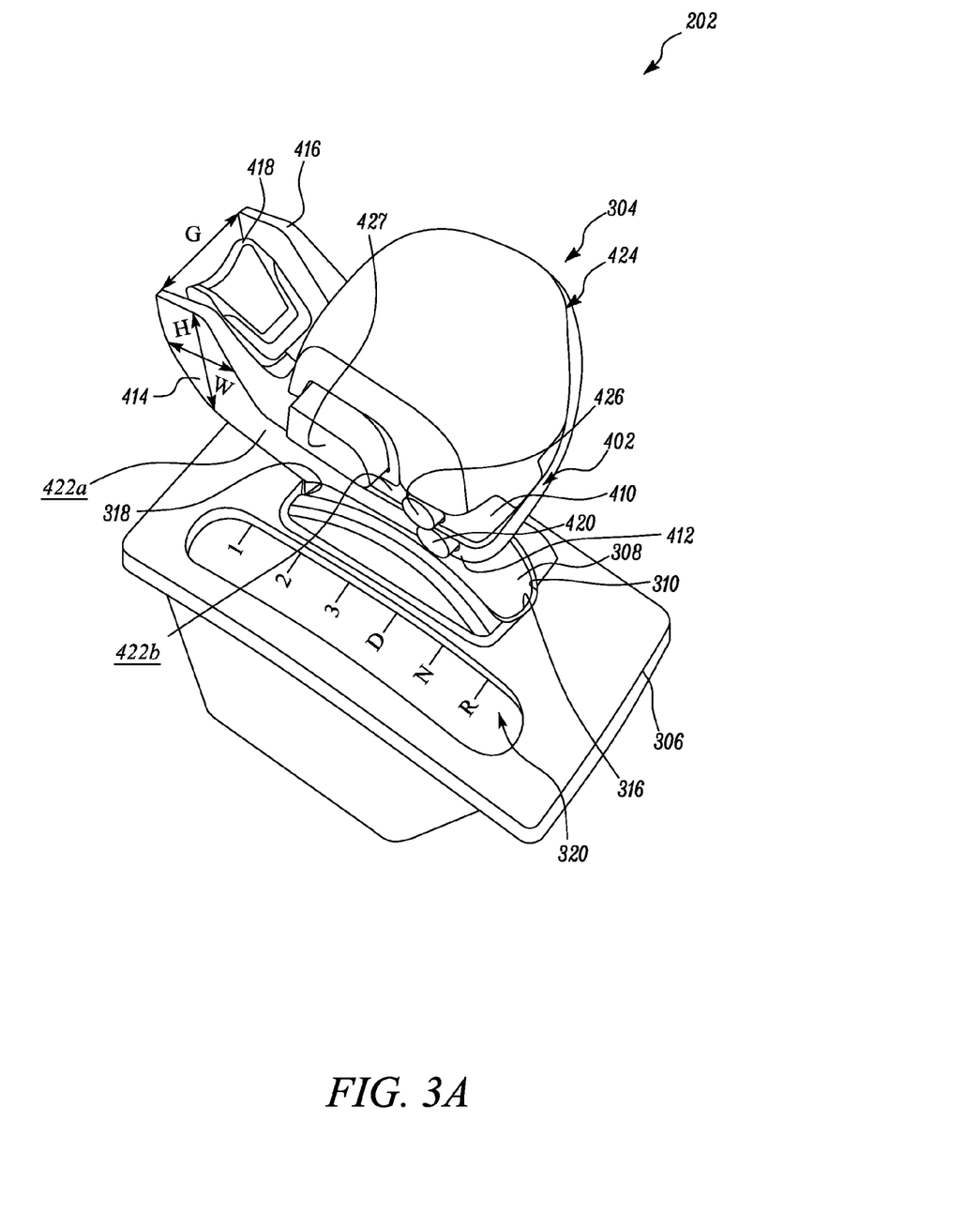
FIG. 3a is a top perspective view of the input device of FIG. 2.
Figure 3B:
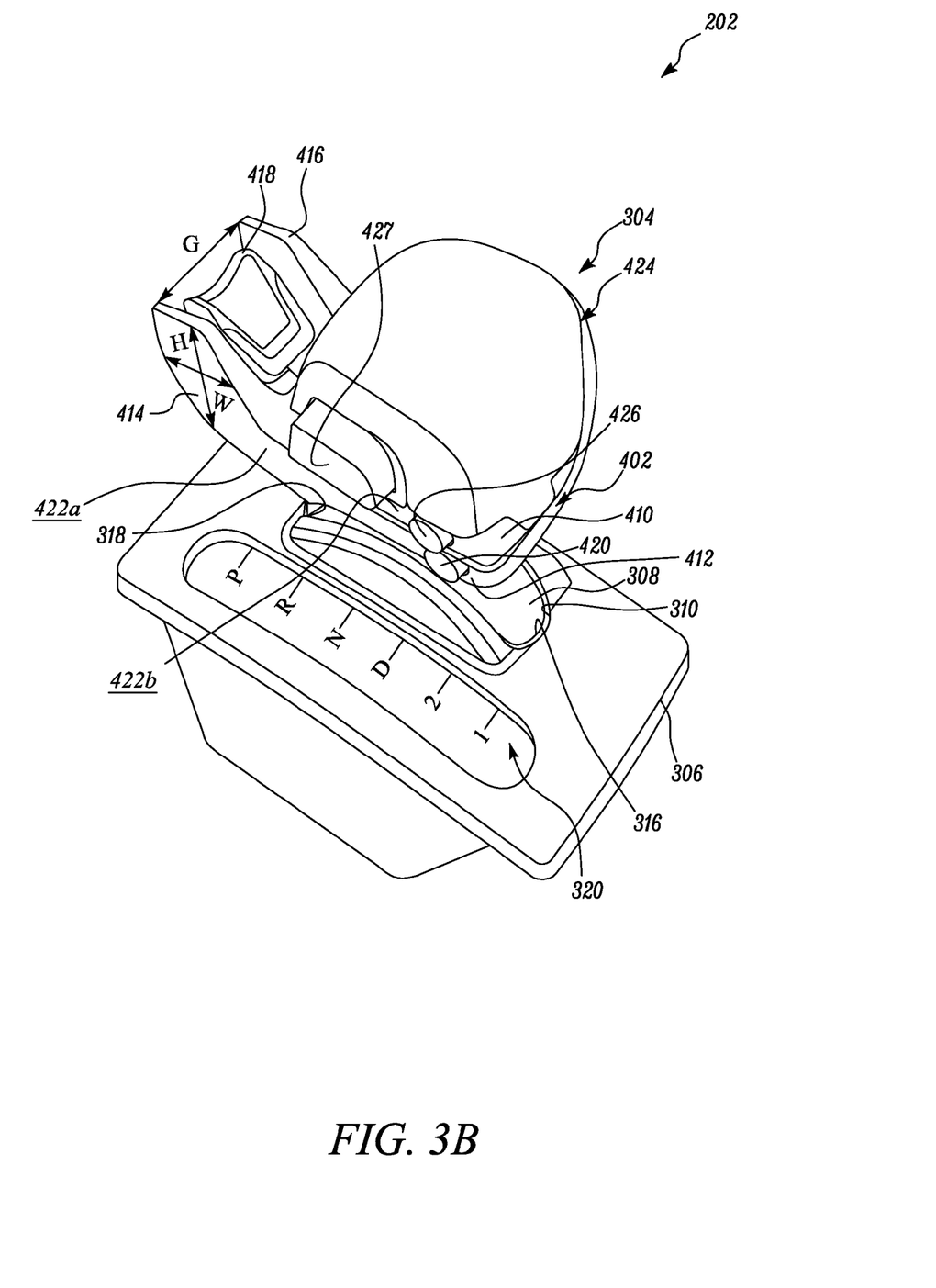
FIG. 3b is a top perspective view of the input device of FIG. 2 in accordance with a exemplary modified embodiment of the present disclosure.

Referring to FIGS. 2, 3a, and 3b, the input device 202 includes a control lever 302 and a knob body 304. The knob body 304 is disposed on the control lever 302. Any one of the control lever 302 and the knob body 304 are operable to select from the available transmission modes of the machine 100, while the other is operable to select from the available hoisting functions associated with the payload carrier 108. With implementation of the control lever 302 and the knob body 304 disclosed herein, the operator may operate the unified structure of the input device 202 with ease. Moreover, the resultant integration of the functionalities associated with the control lever 302 and the knob body 304 into the single input device 202 may allow the operator to select the transmission modes and/or the hoisting functions simultaneously.

The input device 202 additionally includes a basal pod 306 and a detent plate 308. As shown in FIG. 2, the basal pod 306 defines a slotted groove 310 thereon. The detent plate 308 is disposed in operable engagement with the slotted groove 310. An underside of the basal pod 306 may be provided with detents (not shown) that are configured to establish an interfitting and releasable engagement with corresponding detents (not shown) on the detent plate 308.

Further, as shown in FIG. 2, the control lever 302 has a first end 312 coupled to the detent plate 308. The control lever is defined about a vertical axis X and is operable to select from a plurality of transmission modes with movement between a first direction and second direction. As such, the control lever 302 is capable of linear movement between a first end stop 316 and a second end stop 318 of the slotted groove 310. Therefore, it is to be understood that linear movement of the control lever 302 within the slotted groove 310 may bring about a change in the transmission mode of the machine 100.

The control lever 302 and the detent plate 308 are operable to discrete positions for registering the respective transmission modes. Based on the position of the control lever 302, any one of the transmission modes such as drive mode, neutral mode, and reverse mode. Additionally, a first gear, a second gear, and third gear may be included in the transmission modes. As shown in FIG. 3a, the first, second, and third gear are located in sequence before the drive mode.

With continued reference to FIGS. 2, 3a, and 3b, the basal pod 306 includes a plurality of markings 320 disposed alongside the slotted groove 310. The markings 320 may be located to beneficially correspond with positions of the control lever 302 at which the detents of the detent plate 308 and the basal pod 306 mutually accomplish the interfitting and releasable engagement. As shown, the markings 320 are designated in sequence from top-to-bottom by alpha-numerals such as "1", "2", "3", "D", "N", and "R" that are indicative of the first gear, the second gear, the third gear, the drive mode, the neutral mode, and the reverse mode of the transmission respectively.

It is hereby contemplated that in some embodiments of the present disclosure, the first gear "1", the second gear "2", and the third gear "3" depicted in FIG. 3a may be optionally implemented by way of a single forward mode "F" (not shown). The single forward mode "F" can allow the machine 100 to be propelled at the set gear ratio, i.e., the first gear "1", the second gear "2", or the third gear "3".

With reference to the preceding embodiments, it is envisioned that the transmission modes disclosed therein may be beneficially implemented when the machine 100 is an articulated truck such as that as shown in FIG. 1. However, when the machine 100 is embodied as an off-highway truck, the transmission modes may be suitably modified to beneficially include a park mode "P", a reverse mode "R", a neutral mode "N", a drive mode "D", a second gear "2", and a first gear "1" arranged in a top-to-bottom sequence (See FIG. 3b). Therefore, it should be noted that the markings 320 can change depending on the type of the machine.

Moreover, the marking 320 may be implemented in other sequences than those disclosed herein. For example, referring to FIG. 3a, the markings 320 may be re-ordered from top-to-bottom as "D", "N", "R", "1", "2", and "3". Therefore, one of ordinary skill in the art will acknowledge that the order of the markings 320 depicted in FIGS. 2, 3a, and 3b are merely in nature and hence, non-limiting of this disclosure. Any order of markings 320 can be used depending on the type of the machine and/or the transmission modes the control lever 302 is required to execute in the transmission at corresponding positions of the basal pod 306.

As will be understood by a person skilled in the art, the park mode "P" is configured to restrict the movement of the machine 100. For example, during a dump cycle, the machine 100 may be put into the park mode "P" to remain stationary when performing the dump action. In the reverse mode "R", a reverse gear may be engaged in the transmission to allow movement of the machine 100 in the reverse direction. In the neutral mode "N", all gear trains in the transmission of the machine 100 may be disengaged so that the machine 100 can coast freely under its own weight and gain momentum without any motive force from the engine. Furthermore, in the drive mode "D", the transmission control 208 of the machine 100 is allowed to engage the available range of forward gear ratios and allow seamless transition in the gear ratios during forward movement of the machine 100. For example, the drive mode "D" may allow the operator to move the machine 100 in the forward direction and accelerate using the complete range of available gear ratios. Further explanation pertaining to the drive mode "D" of the transmission will be made later in this document.

Figure 4:
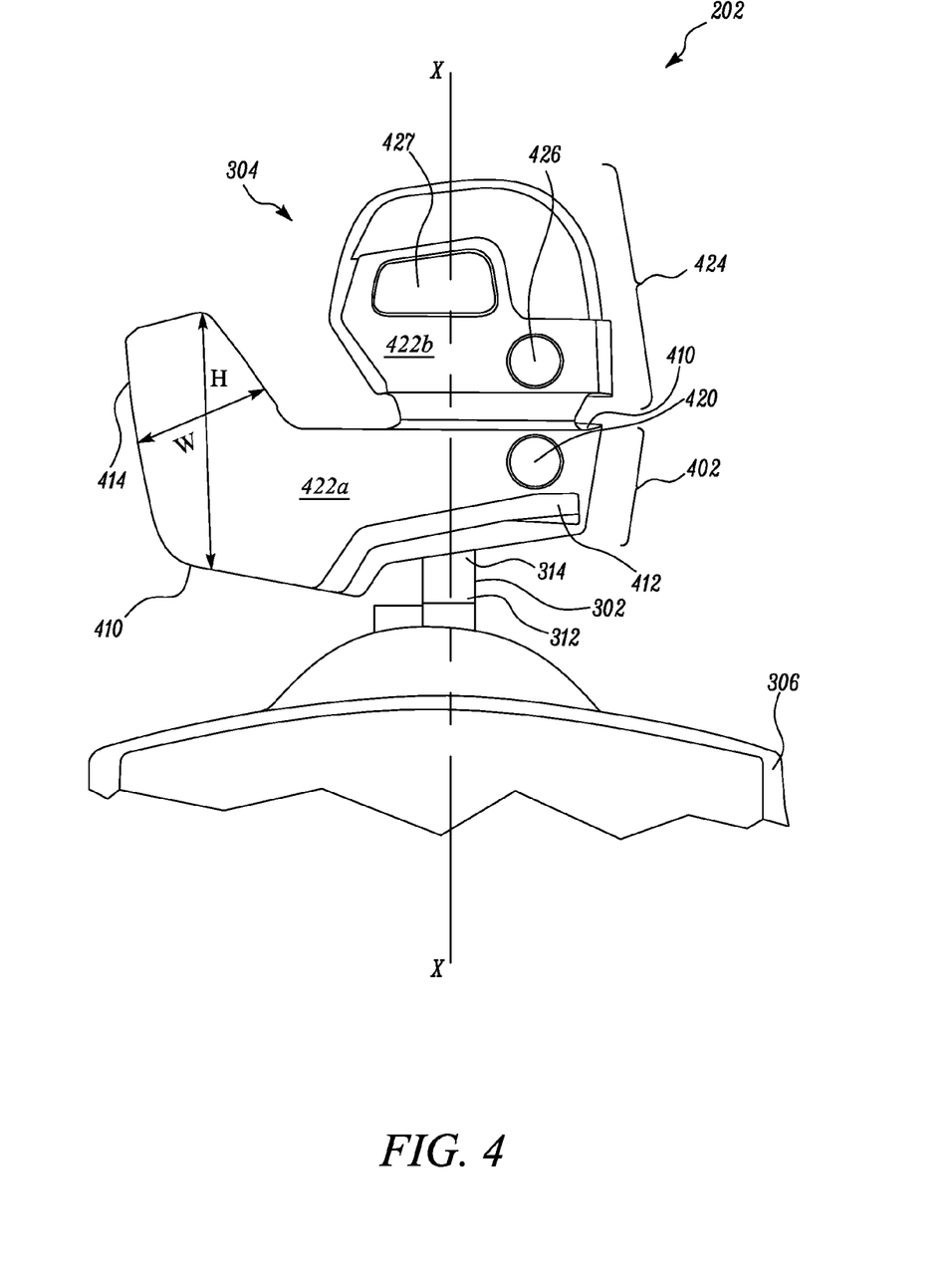
FIG. 4 is a side view of an input device for the machine.
Figure 5:
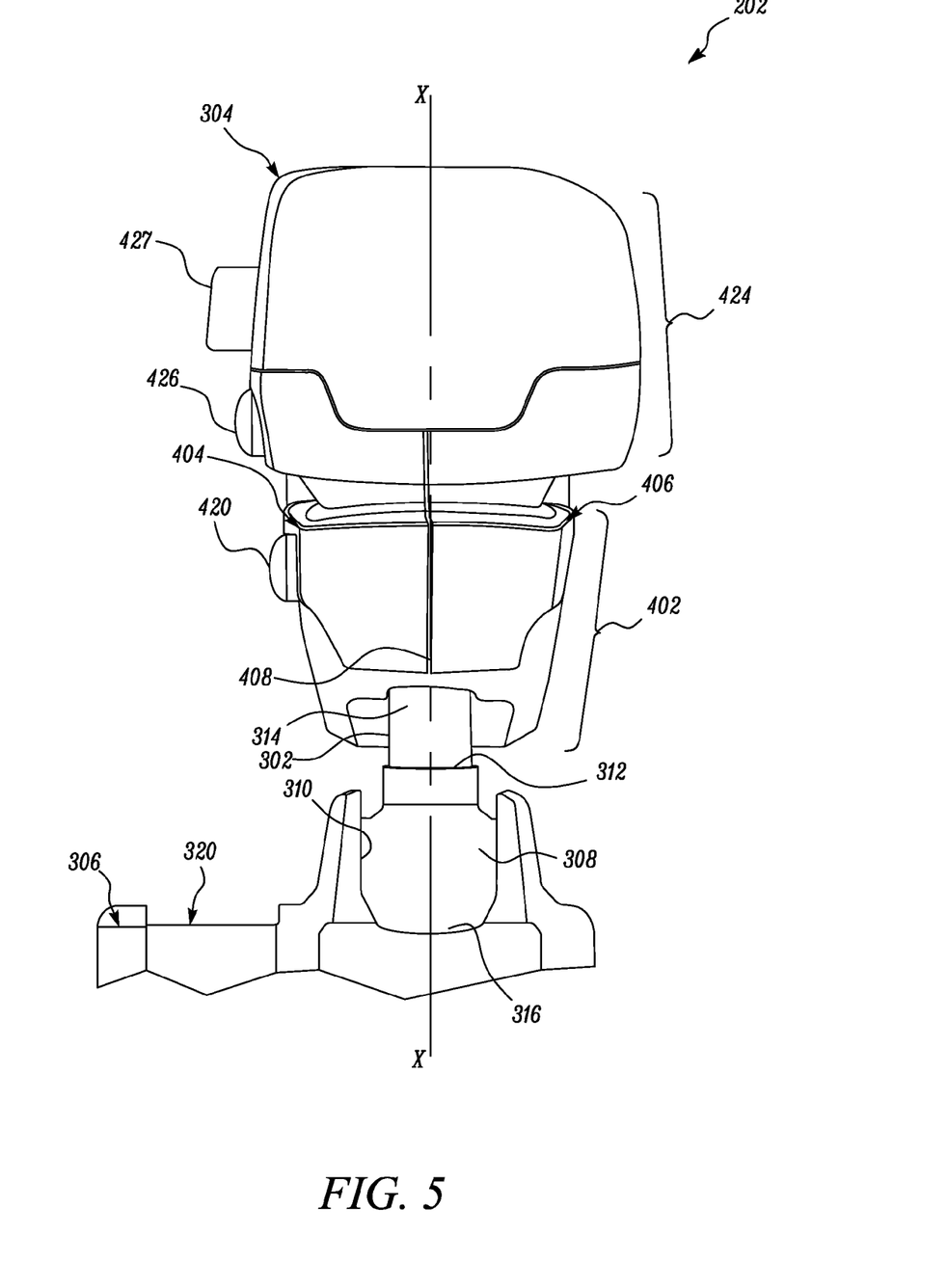
FIG. 5 is a rear view of the input device.

Referring to FIG. 4, the knob body 304 is coupled to a second end 314 of the control lever 302. The knob body 304 includes a lower segment 402 extending out from the vertical axis X of the control lever 302. As such, a substantially elongated length of the lower segment 402 is disposed forward and rearward of the control lever 302. As shown, the lower segment 402 is laterally disposed to the control lever 302 and is coupled to the second end 314 of the control lever 302. As shown in FIG. 5, in an embodiment, the lower segment 402 may be beneficially made up of two half-portions 404, 406 that are divided along a longitudinal parting line 408. The two half-portions 404, 406 may include catches, clamps, or other types of interlocking features defined thereon such that when the half-portions 404, 406 are brought together, the catches, clamps, or other interlocking features can accomplish a mutually releasable engagement of the two half-portions 404, 406.

Further, it can also be contemplated to provide one or more locking elements on the knob body 304 and/or the control lever 302 such that the locking elements positionally restrict the knob body 304 relative to the control lever 302. The locking elements may hence, prevent any axial and/or rotational movement of the knob body 304 relative to the control lever 302. For example, the knob body 304 and the control lever 302 may be provided with an integrally formed tongue and groove joint located within an interior volume of the knob body 304 to positionally lock the knob body 304 and hence, prevent the knob body 304 from rotating about or sliding along the control lever 302. Many structures are commonly known to one having ordinary skill in the art and such structures may be readily employed to accomplish a locking of the knob body 304 onto the control lever 302. Some such structures can include, but are not limited to, a pin and socket arrangement, splines, keys, split rings, locking rings.

Referring back to FIGS. 3a, 3b, 4 and 6, the lower segment 402 includes a pair of upright protrusions 414, 416 extending out from an upper portion 410 thereof. The protrusions 414, 416 define a gap G therebetween. Moreover, the lower segment 402 includes a movable switch 418 disposed between the pair of protrusions 414, 416. The movable switch 418 is operable to select from various hoisting functions that are executable by the actuator 116. In an embodiment, the hoisting functions of the actuator 116 can include a lower, hold, float, and raise functions.

It should be understood that the raising and lowering functions are associated with the physical movement of the payload carrier 108 away from or towards the frame 102 of the machine 100 respectively. The hold function is used to retain a current position of the payload carrier 108 between defined limits. The float function is related to holding the payload carrier 108 above a defined limit.

In the illustrated embodiments, the protrusions 414, 416 are sized to cover the movable switch 418 in its float position which is, typically, the recommended position for driving and parking applications. However, in alternative embodiments of the present disclosure, it can be optionally contemplated to use protrusions 414, 416 of a size that covers a full range of movement executable by the movable switch 418. Therefore, in this embodiment, the protrusions 414, 416 may have a height H and width W that is greater than a full range of movement executable by the movable switch 418. However, with reference to various embodiments of the present disclosure, it is to be noted that the height H and width W of the protrusions 414, 416 is selected so as to prevent the operator from inadvertently bumping into the movable switch 418 and initiating any hoisting functions in the actuator 116 of the machine 100.

Referring back to FIGS. 3a, 3b and 6, the lower segment 402 also includes a first actuation switch 420 located on a sidewall 422a thereof. The first actuation switch 420 is disposed proximal to the lower portion 412 of the lower segment 402.

The knob body 304 further includes an upper segment 424 disposed about the vertical axis X of the control lever 302. The upper segment 424 is located proximate to the upper portion 410 of the lower segment 402. Moreover, the upper segment 424 is in a spaced relationship relative to the protrusions 414, 416. The upper segment 424 includes a second actuation switch 424 provided on a sidewall 422b thereof. As best shown in FIG. 5, the sidewalls 422a, 422b of the lower and upper segments 402, 424 are substantially co-planar to each other. Moreover, the second actuation switch 426 is located above the first actuation switch 420.

With reference to various embodiments, it is envisioned that the sidewalls on which the first and second actuation switches 420, 426 are located may be left-handed sidewalls 424a, 424b or right-handed sidewalls 422a, 422b respectively (as shown in FIG. 5 when looking from the rear of the input device 202). For example, if the operator is right-handed, then it may be beneficial to provide the first and second actuation switches 420, 426 of the present disclosure on the right-handed sidewalls 422a, 422b of the lower and upper segments 402, 424 of the knob body 304 (as shown). However, if the operator is left-handed, then it may be beneficial to position the first and second actuation switches 420, 426 on the left-handed sidewalls 424a, 424b of the lower and upper segments 402, 424.

Moreover, it can also be contemplated to optionally position the first and second actuation switches 420, 426 on opposing sidewalls 422a, 424a, or 422b, 424b of the same or distinct segments 402, 424. For example, both the first and second actuation switches 420, 426 may be located on the lower segment 402 alone in which the first actuation switch 420 can be positioned on the right-handed sidewall 422a while the second actuation switch 426 can be positioned on the left-handed sidewall 424a of the lower segment 402 respectively. Alternatively, in another example, the first and second actuation switches 420, 426 of the present disclosure may be located on opposing sidewalls 422b, 424b of the upper segment 424. Therefore, one of ordinary skill in the art will appreciate that depending on a handedness of the operator and/or the relative positions of the operator and the input device 202, the first and second actuation switches 420, 426 can be interchangeably located on the right or left-handed sidewalls 422a, 422b, 424a, 424b of the lower and upper segments 402, 424.

In the illustrated embodiment, the first and second actuation switches 420, 426 may be operable to set a maximum gear of the selected transmission mode. For example, the operator may set a specified gear limit and/or speed limit beyond which the machine 100 should not operate. This feature may enhance and ensure safe operation of the machine 100 even during the dump cycle of the machine 100.

Additionally, one or more of the first and second actuation switches 420, 426 may be used to hold a gear of the selected transmission mode. In an embodiment, based on an actuation force applied by the operator, the second actuation switch 426 may also be used to hold a particular gear ratio in the transmission when the control lever 302 is in the drive mode "D". The actuation force may be a momentary press or a continuous press applied to the second actuation switch 426. For example, the second actuation switch 426 can be pressed momentarily to hold the transmission at a particular gear ratio therein.

Alternatively, the second actuation switch 426 can be pressed continuously to hold the transmission at a particular gear ratio. However, it is to be noted that the above described implementation is merely exemplary and does not limit the scope of the present disclosure. One of ordinary skill in the art will understand that any manner of operation and functionality can be correspondingly associated with the second actuation switch 426 when the control lever 302 is in the drive mode "D" without deviating from the spirit of the present disclosure.

In an embodiment, the single forward mode "F", disclosed herein, may include a gear range having a 3-2-1 configuration. Alternatively, the gear range may have a 2-1 or a 4-3-2-1 configuration depending on the number of forward gears in the transmission. In some cases, when the machine 100 is in the forward mode "F", it is contemplated that the operator can optionally move and accelerate the machine 100 using the available gear ranges by using the first and second actuation switches 420, 426. As will be understood by a person skilled in the art, a third gear in the transmission produces lower torque or higher acceleration at the wheels 104 of the machine 100 as compared to the first or the second gear.

Alternatively, the first and second actuation switches 420, 426 may be operable to execute gear shifts in the transmission of the machine 100 when the control lever 302 is in the drive mode "D". In an embodiment, the first actuation switch 420 may be used to perform a downshift a gear in the transmission while the second actuation switch 426 may be used to perform an upshift in a gear of the transmission. For example, the operator may shift the gear up or down as desired for the selected transmission setting by pressing the respective button. However, in an alternative embodiment, the functions of the first and second actuation switches 420, 426 may be reversed by which the first actuation switch 420 may be used to perform an upshift while the second actuation switch 426 may be used to perform a downshift in the transmission.

The upper segment 424 further includes a locking switch 427 that is operable to allow selective movement of the control lever 302. The locking switch 427 can be used to arrest or allow movement of the control lever 302. I.e., the locking switch 427 can be used to lock or unlock the control lever 302 at or from a specified position on the slotted groove 310.

The locking switch 427 may be a push-button (as shown), or may include other types of switches known in the art such as, but not limited to, a rotary switch, a rocker switch, and the like. The locking switch 427 is operable to hold the control lever 302 in a selected transmission mode. A person of ordinary skill in the art will appreciate that the design of the locking switch 427 shown in the accompanying figures is exemplary. The locking switch 427 may additionally include other components not described herein. Moreover, the placement of the locking switch 427 may also be chosen so as to allow ease in usage thereof.

With reference to the illustrated embodiment, the locking switch 427 may be depressed once and left to remain in the depressed state to allow movement of the control lever 302. At this point, the control lever 302 can be moved out of its current position into any of the other transmission modes listed on the basal pod 306. Hence, if the machine 100 is in the neutral mode "N", and the operator wishes to back up the machine 100 (i.e., move the machine 100 in the reverse direction), then the operator may depress the locking switch 427 once to unlock the control lever 302 from its current position i.e., the forward mode "F". Hereafter, the operator may move the control lever 302 into the reverse mode "R". However, if the operator now wishes to lock the control lever 302 at the position corresponding to the reverse mode "R", the operator may depress the locking switch 427 for the second time and lock the control lever 302 at its new position i.e., the reverse mode "R".

A person having ordinary skill in the art will appreciate that when in the un-depressed state, the locking switch 427 serves to prevent any accidental bumping of the control lever 302 and consequently any inadvertent movement of the machine 100. This feature may enhance and ensure safe operation of the machine 100 even during the dump cycle of the machine 100.

However, in an alternative embodiment, it is also contemplated that the locking switch 427 can be depressed and held in such depressed state by the operator in order to execute movement of the control lever 302. Thereafter, if the operator wishes to lock the control lever 302 at any specified position on the basal pod 306, the operator may merely release the locking switch 427. Therefore, it is to be noted that although various methods of operating the locking switch 427 are explained by way of the specific embodiments herein, any manner or method of operating may be beneficially implemented on the locking switch 427 depending on specific requirements of an application.

Figure 6:
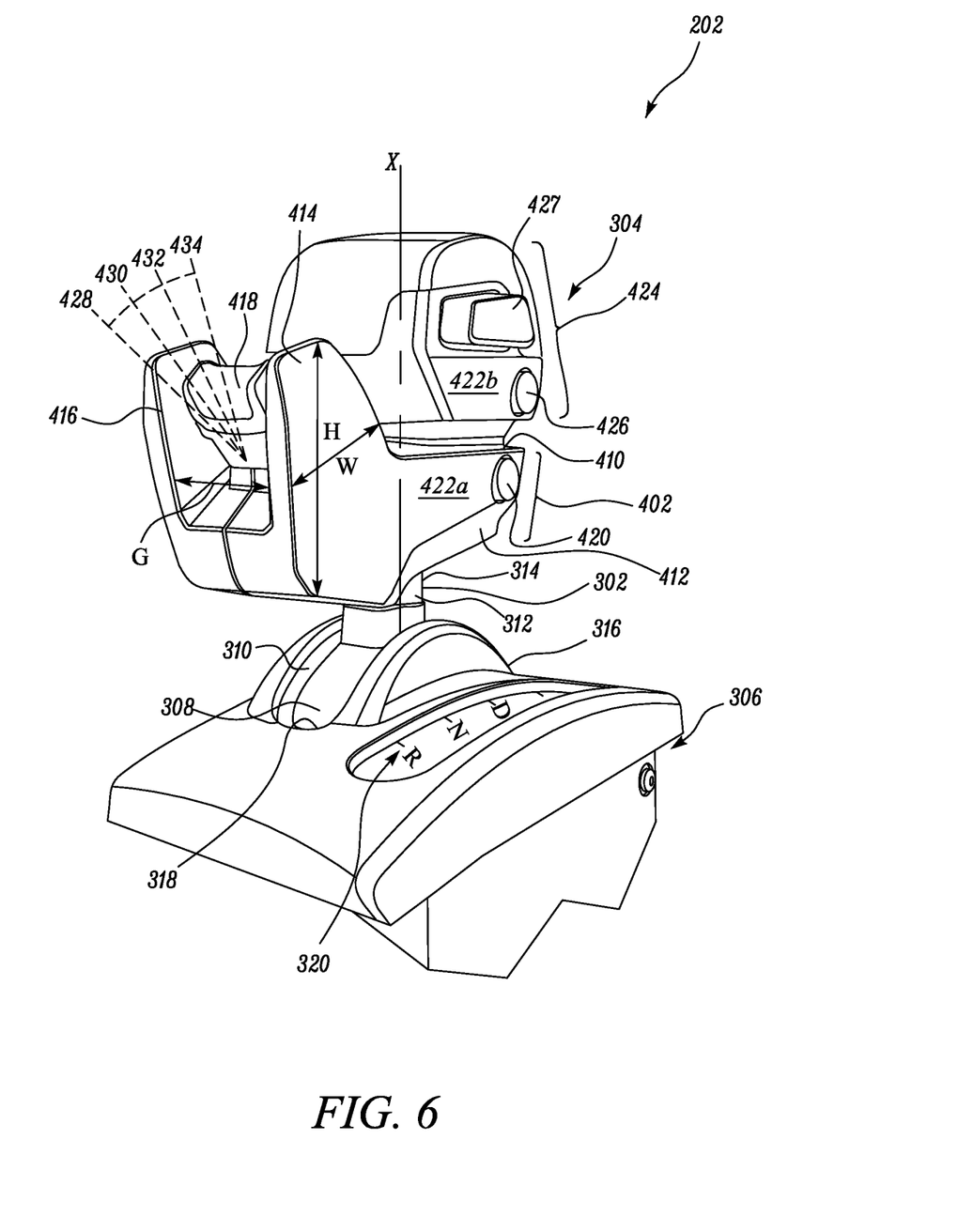
FIG. 6 is a front perspective view of the input device illustrating various operational positions of a detent switch disposed on the input device.

Referring to FIG. 6, the movable switch 418 may include detents (not shown) for enabling the movable switch 418 to be in one of four possible states. The detents on the movable switch 418 may define four distinct states of hoisting function. As such, the detents are used to mechanically resist the movement of the movable switch 418 from a selected state of hoisting function. Based on the selected state of the movable switch 418, the payload carrier 108 may be lowered, held, floated, or raised. The above described implementation is merely exemplary and does not limit the scope of the present disclosure. The functioning of the movable switch 418 described herein can be suitably adapted to execute other operations in the machine 100 depending on specific requirements of an application.

With reference to the illustrated embodiments, the movable switch 418 may be moved into the first detent 428 to raise the payload carrier 108. When the movable switch 418 is moved into a second detent 430, the payload carrier 108 may be held in its current position. Further, when the movable switch 418 is moved past the second detent 430 and into a third detent 432, then the payload carrier 108 may float at a position. Furthermore, when the movable switch 418 is moved into the fourth detent 434, the payload carrier 108 may be lowered.

INDUSTRIAL APPLICABILITY

Typically, distinct control levers have been used to control the transmission settings and the hoisting functions of the machine respectively. A first lever may allow the operator to set transmission modes and gear shifts in the respective transmission modes of the machine; while, a second lever may allow the operator to control and execute one or more hoisting functions associated with the payload carrier of the machine. However, such configuration of distinct control levers may entail space constraints within the cab of a given machine. Further, the operator may face issues with dexterity of operating the control levers and/or difficulty in operating both the transmission and hoisting functions of the machine simultaneously.

The input device 202 of the present disclosure enables simultaneous control of the transmission modes and the hoisting functions in the machine 100 without requiring the operator to move his hands from one lever to another. As such, the input device 202 provides for an ergonomically improved design so that the operator can be adept at simultaneously controlling the transmission and hoisting functions of the machine 100. Moreover, the design of the input device 202 disclosed herein provides for more ergonomic handling by the operator thereby reducing fatigue typically experienced with use of previously known control levers.

Moreover, the input device 202 may provide better space utilization within the cab 114 of the machine 100. Although it is disclosed herein that the input device 202 is used on the articulated truck having the payload carrier 108, the input device 202 can also be employed by other machines having other types of transmissions, articulated containers, or even articulated work implements coupled thereto. Further, the functionalities of the various switches and/or buttons of the input device 202 can be suitably adapted depending on the type of machine and other specific requirements of an application in which the associated machines are used. Therefore, additional or optional functionalities in lieu of those disclosed herein can also be implemented into the input device 202 as per requirements of an application.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A knob body for a control lever of a machine, the knob body comprising:
   a lower segment extending out from a vertical axis of the control lever, the lower segment including a pair of upright protrusions extending out from an upper portion of the lower segment of the control lever and defining a gap between the protrusions,
   a movable switch extending from the upper portion within the gap between the protrusions;
   an upper segment disposed about the vertical axis of the control lever and located proximate to the upper portion of the lower segment, the upper segment in a spaced relationship relative to the protrusions, the upper segment including at least one of a locking switch operable to allow selective movement of the control lever and an actuation switch.

2. The knob body of claim 1, wherein the protrusions are sized to cover a full range of movement of the movable switch, and wherein the protrusions extends at least at or above the movable switch.

3. The knob body of claim 1, wherein the movable switch is operable to select from a plurality of hoisting functions of the machine.

4. The knob body of claim 1, wherein the actuator switch is a first actuation switch, the body further including a second actuation switch, wherein the first and second actuation switches are disposed on a sidewall of the knob body.

5. The knob body of claim 4, wherein each of the first and second actuation switches is operable to execute gear shifts in a transmission of the machine.

6. The knob body of claim 4, wherein the first and second actuation switches is disposed at one of fore and aft of the control lever.

7. An input device for controlling a machine, the input device comprising:
   a basal pod defining a slotted groove thereon;
   a detent plate disposed in operable engagement with the slotted groove;
   a control lever coupled to the detent plate and defined about a vertical axis, the control lever operable to select from a plurality of transmission modes with movement between a first direction and second direction;
   a knob body coupled to the control lever, the knob body comprising:
      a lower segment laterally disposed in relation to the vertical axis of the control lever;
      a pair of upright protrusions extending out from an upper portion of the lower segment, the protrusions defining a gap therebetween;
      a movable switch extending from the upper portion and located within the gap defined between the protrusions; and
      an upper segment disposed about the vertical axis of the control lever and located proximate to the upper portion of the lower segment, the upper segment in a spaced relationship relative to the protrusions; and a locking switch operable to allow selective movement of the control lever.

8. The input device of claim 7, wherein the protrusions extends at least at or above the movable switch.

9. The input device of claim 8, wherein the protrusions are sized to cover a full range of movement of the movable switch.

10. The input device of claim 7, wherein the control lever and the detent plate are operable to discrete positions for registering one or more of the transmission modes.

11. The input device of claim 7, wherein the knob body further includes a first actuation switch and a second actuation switch, wherein each of the first and second actuation switches is operable to execute gear shifts in a transmission of the machine.

12. The input device of claim 11, wherein the first and second actuation switches is disposed at one of fore and aft of the control lever.

13. The input device of claim 7, wherein the movable switch is operable to select from a plurality of hoisting functions of the machine.

14. The input device of claim 13, wherein the plurality of hoisting functions includes at least one of lower, hold, float, and raise functions.

15. A machine comprising:
a frame;
a transmission disposed on the frame;
a payload carrier pivotally attached to the frame;
an actuator coupled between the frame and the payload carrier, the actuator configured to raise and lower the payload carrier relative to the frame;
an input device communicably coupled to the transmission and the actuator, the input device including a basal pod, a control lever extending upright from the basal pod about a vertical axis, wherein the control lever is operable to select from a plurality of transmission modes with movement between a first direction and second direction, a knob body coupled to the control lever, the knob body including a lower segment laterally disposed in relation to the vertical axis of the control lever, the lower segment having a pair of upright protrusions extending out from an upper portion of the lower segment, the protrusions defining a gap therebetween, a movable switch extending from the upper portion and located within the gap defined between the protrusions, wherein the movable switch is operable to select from a plurality of hoisting functions for the payload carrier.

16. The machine of claim 15, wherein the knob body includes a locking switch operable to allow selective movement of the control lever.

17. The machine of claim 16, wherein the basal pod defines a groove thereon, and the input device further includes a detent plate disposed in operable engagement with the groove, and the control lever coupled to the detent plate, wherein the control lever and the detent plate are operable to discrete positions for registering one or more of the transmission modes.

18. The machine of claim 15, wherein the knob body includes a first actuation switch and a second actuation switch, wherein each of the first and second actuation switches is operable to execute gear shifts in a transmission of the machine.

19. The machine of claim 15, further includes a control unit communicably coupled to the transmission and the actuator and to the input device, wherein in response to movement of the control lever command signals are sent to the transmission via the control unit for transmission control, and in response to movement of the movable switch command signals are sent to the actuator via the control unit for hoisting control of the payload carrier.

20. The machine of claim 15, wherein the plurality of hoisting functions includes at least one of lower, hold, float, and raise functions.

* * * * *